US012576727B2

(12) United States Patent (10) Patent No.: US 12,576,727 B2
Laine et al. (45) Date of Patent: Mar. 17, 2026

(54) DIFFERENTIAL ELECTRICAL DRIVE ARRANGEMENT FOR HEAVY DUTY VEHICLES

(71) Applicant: VOLVO TRUCK CORPORATION, Gothenburg (SE)

(72) Inventors: Leo Laine, Härryda (SE); Mattias Åsbogård, Mölnlycke (SE); Leon Henderson, Härryda (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 216 days.

(21) Appl. No.: 17/758,762

(22) PCT Filed: Jan. 15, 2020

(86) PCT No.: PCT/EP2020/050849
    § 371 (c)(1),
    (2) Date: Jul. 13, 2022

(87) PCT Pub. No.: WO2021/144009
    PCT Pub. Date: Jul. 22, 2021

(65) Prior Publication Data
    US 2023/0068987 A1     Mar. 2, 2023

(51) Int. Cl.
    *B60L 15/20* (2006.01)
    *B60L 3/00* (2019.01)
    *B60L 3/10* (2006.01)

(52) U.S. Cl.
    CPC ......... *B60L 15/2036* (2013.01); *B60L 3/0061* (2013.01); *B60L 3/102* (2013.01);
    (Continued)

(58) Field of Classification Search
    CPC .... B60L 15/2036; B60L 3/0061; B60L 3/102; B60L 3/104; B60L 2200/28;
    (Continued)

(56) References Cited

U.S. PATENT DOCUMENTS 4,682,667 A     7/1987 Hosaka
5,419,624 A     5/1995 Adler et al.
                (Continued)

FOREIGN PATENT DOCUMENTS

CN     1829621 A     9/2006
CN     101786452 A     7/2010
                (Continued)

OTHER PUBLICATIONS

English translation of Schanz et al. (DE 102011081709) (Year: 2013).*

(Continued)

*Primary Examiner* — Kyle J Kingsland

(74) *Attorney, Agent, or Firm* — Jeffri A. Kaminski; Venable LLP

(57)     ABSTRACT

A control unit for a heavy duty vehicle. The vehicle includes an electric machine connected to first and second driven wheels via an differential. The control unit includes a first wheel slip control module associated with the first driven wheel, and a second wheel slip control module associated with the second driven wheel, where each wheel slip control module is arranged to determine an obtainable torque by the respective wheel based on a current wheel state, wherein the control unit is arranged to determine a required torque to satisfy a requested acceleration profile by the vehicle, and to request a torque from the electrical machine corresponding to the smallest torque out of the obtainable torques for each driven wheel and the required torque.

16 Claims, 4 Drawing Sheets

(52) U.S. Cl.
CPC ........... *B60L 3/104* (2013.01); *B60L 2200/28* (2013.01); *B60L 2200/36* (2013.01); *B60L 2240/423* (2013.01); *B60L 2240/461* (2013.01); *B60L 2240/465* (2013.01); *B60Y 2200/145* (2013.01); *B60Y 2200/91* (2013.01)

(58) Field of Classification Search
CPC ........... B60L 2200/36; B60L 2240/423; B60L 2240/461; B60L 2240/465; B60L 2240/463; B60L 3/12; B60Y 2200/145; B60Y 2200/91; Y02T 10/72
See application file for complete search history.

(56) References Cited

U.S. PATENT DOCUMENTS

| | | | | |
|---|---|---|---|---|
| 2004/0029682 | A1* | 2/2004 | Sauter | F16H 41/30 477/97 |
| 2013/0289809 | A1* | 10/2013 | Treharne | B60L 3/0046 180/65.285 |
| 2014/0207320 | A1* | 7/2014 | Wright | B60L 15/20 701/22 |
| 2016/0082972 | A1 | 3/2016 | Fairgrieve et al. | |
| 2016/0107540 | A1 | 4/2016 | Zhang et al. | |
| 2016/0214486 | A1 | 7/2016 | Suzuki | |
| 2017/0217314 | A1 | 8/2017 | Bachman | |
| 2017/0217414 | A1 | 8/2017 | Krebs et al. | |
| 2019/0168744 | A1* | 6/2019 | Ienaga | B60K 1/02 |
| 2019/0176784 | A1* | 6/2019 | Laine | B60T 8/172 |
| 2019/0225226 | A1 | 7/2019 | Kang et al. | |
| 2019/0381895 | A1* | 12/2019 | Shindo | B60L 15/2081 |

FOREIGN PATENT DOCUMENTS

| | | | |
|---|---|---|---|
| CN | 102501779 | A | 6/2012 |
| CN | 104364135 | A | 2/2015 |
| CN | 105492244 | A | 4/2016 |
| CN | 107531237 | A | 1/2018 |
| CN | 109070877 | A | 12/2018 |
| CN | 109955727 | A | 7/2019 |
| CN | 110040126 | A | 7/2019 |
| CN | 110126807 | A | 8/2019 |
| DE | 102011081709 | A1 * | 2/2013 ......... B60L 11/1803 |
| EP | 3050765 | A1 | 8/2016 |
| JP | 2005047313 | A | 2/2005 |
| JP | 2015056965 | A | 3/2015 |
| KR | 102065986 | B1 | 1/2020 |
| SE | 539498 | C2 | 10/2017 |
| WO | 2013076902 | A1 | 5/2013 |
| WO | WO-2017215751 | A1 * | 12/2017 ........... B60T 8/1708 |
| WO | 2021144009 | A1 | 7/2021 |

OTHER PUBLICATIONS

International Search Report and Written Opinion in corresponding International Application No. PCT/EP2020/050849 mailed Oct. 14, 2020 (14 pages).

International Preliminary Report on Patentability in corresponding International Application No. PCT/EP2020/050849 mailed Jan. 21, 2021 (6 pages).

Japanese Office Action dated Oct. 27, 2023 in corresponding Japanese Patent Application No. 2022542396, 8 pages.

Kiencke and Nielsen, "Automotive Control Systems—For Engine, Driveline and Vehicle" Springer Berlin Heidelberg New York, 2005 ISBN:SBN3-540-23139.

Stellet et al., "Model-Based Traction Control for Electric Vehicles" ATZ elektronik, vol. 9, Feb. 2014, particular relevance: pp. 44 to 50.

Ivanov et al., Edwards, "A Survey of Traction Control and Anti lock Braking Systems of Full Electric Vehicles With Individually Controlled Electric Motors" IEEE Transaction on Vehicular Technology, 2014.

Loof et al., "Traction Control of an Electric Formula Student Racing Car" Department of Mechanical Engineering, Eindhoven, University Technology, 2014.

Presentation: International Automotive Engineering Spring School - Vehicle Dynamics, Technische Hochschule Ingolstadt, 2016.

Thesis "2016, Ewin, Traction Control for Electric Vehicles with Independently Driven Wheels", Publisher: University of Oxford.

European Communication of a notice of Opposition dated Sep. 19, 2024 in corresponding European Patent Application No. 20701159. 4, 55 pages.

Chinese Office Action dated Oct. 23, 2024 in corresponding Chinese Patent Application No. 202080092615.5, 22 pages.

* cited by examiner

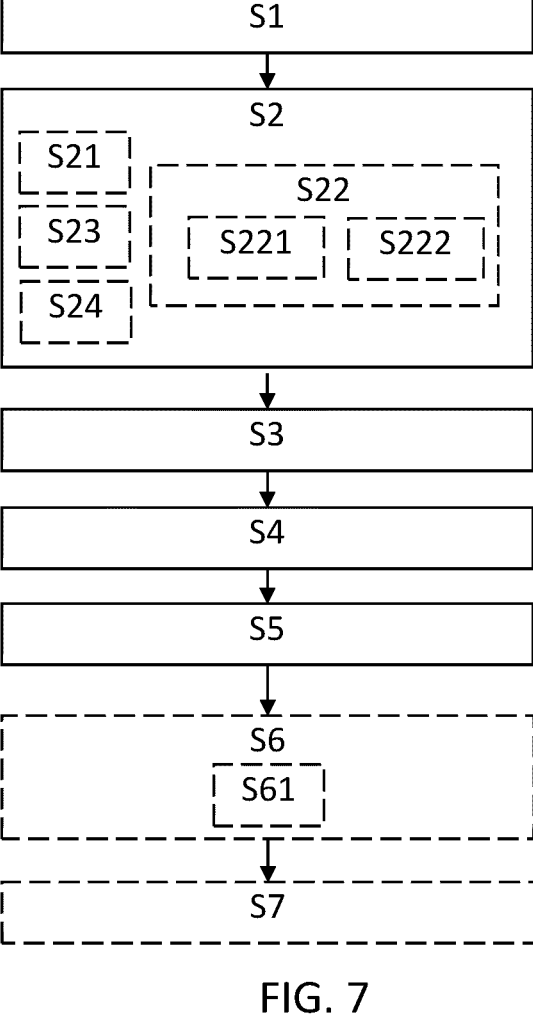
FIG. 7
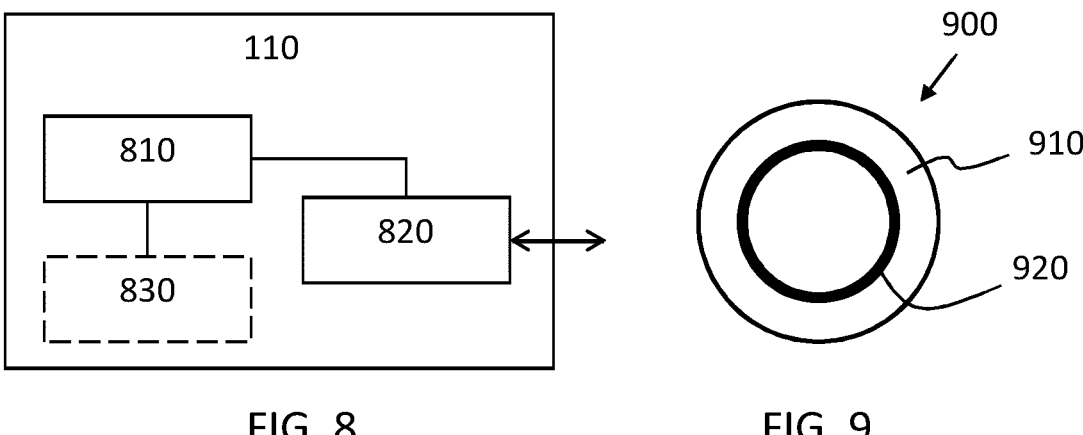
FIG. 8                    FIG. 9

DIFFERENTIAL ELECTRICAL DRIVE ARRANGEMENT FOR HEAVY DUTY VEHICLES

CROSS-REFERENCE TO RELATED APPLICATIONS

This application is a U.S. National Stage application of PCT/EP2020/050849, filed Jan. 15, 2020 and published on Jul. 22, 2021, as WO 2021/144009, all of which is hereby incorporated by reference in its entirety.

TECHNICAL FIELD

The present disclosure relates to electrical drive arrangements for heavy duty vehicles, and in particular to drive arrangements comprising an open differential. The invention can be applied in heavy-duty vehicles, such as trucks and construction equipment. Although the invention will be described mainly with respect to cargo transport vehicles such as semi-trailer vehicles and trucks, the invention is not restricted to this particular type of vehicle but may also be used in other types of vehicles such as electrically powered dolly units and passenger cars.

BACKGROUND

A differential is a drive arrangement comprising three shafts. It has the property that the rotational speed of one shaft is the average of the speeds of the others, or at least a fixed multiple of that average. Another property is that during braking and propulsion the wheel shafts will split the wheel longitudinal forces equally over the wheels, wheel force is then limited by the smallest force available from left and right tyre.

In trucks and other wheeled vehicles, the differential allows the outer drive wheel to rotate faster than the inner drive wheel during a turn. This is beneficial as the vehicle turns, making the wheel that is traveling around the outside of the turning curve roll farther than the other. The average of the rotational speed of the two driving wheels equals the input rotational speed of the drive shaft. An increase in the speed of one wheel is balanced by a decrease in the speed of the other.

A differential normally transfers an equal amount of torque from the drive shaft to both wheels. However, if one wheel requires less power to turn than the other wheel, such as when one wheel is on dry pavement and the other on a muddy shoulder or on a spot of ice, it will take less torque to turn the wheel experiencing lower friction than to turn the wheel on high friction roadway. The low friction wheel then decides the longitudinal force possible to generate by both wheels which may not be ideal. The driven wheels of a vehicle with a differential can therefore spin at different speeds with respect to each other.

Electrically powered vehicles comprise one or more electric machines arranged to propel the vehicle. These electric machines are often capable of generating significant torque already at low speeds, which may cause severe wheel slip if the requested torque is not carefully controlled.

US2016214486 discloses a device for controlling the stability of an electric vehicle when slip occurs. However, there is a need for further improvements in differential electrical drive arrangements for electric vehicles.

SUMMARY

It is an object of the present disclosure to provide improved differential drive arrangements for electrically powered vehicles. This object is at least in part obtained by a control unit for a heavy duty vehicle. The vehicle comprises an electric machine connected to first and second driven wheels via a differential. The control unit comprises a first wheel slip control module associated with the first driven wheel, and a second wheel slip control module associated with the second driven wheel, where each wheel slip control module is arranged to determine an obtainable torque by the respective wheel based on a current wheel state. The control unit is also arranged to determine a required torque to satisfy a requested acceleration profile by the vehicle, and to request a torque from the electrical machine corresponding to the smallest torque out of the obtainable torques for each driven wheel and the required torque.

This way the torque applied by the electric machine is limited in order to avoid undesired levels of wheel slip. The control system accounts for current driving scenario, which is an advantage. Advantageously, a differential locking arrangement can be avoided by the herein proposed techniques.

According to aspects, the current wheel state comprises wheel speed. Each wheel slip control module is arranged to obtain a vehicle velocity, to determine a current wheel slip, and to determine the obtainable torque based on a comparison between the current wheel slip and a configurable wheel slip limit.

This way the wheel slip control is efficiently handled by the control unit. The electric machine torque is controlled in dependence of current driving scenario, which is an advantage.

According to aspects, the current wheel state comprises a current wheel slip value obtained by the wheel slip control module as part of a capability message received from a wheel end module associated with the respective wheel. Each wheel slip control module is arranged to determine the obtainable torque based on a comparison between the current wheel slip and a desired wheel slip. This way a part of the complexity in the system is shifted down to the motion support devices (MSD), which may be an advantage in some situations. The data obtained from the MSD device related to current wheel slip can be used in combination with wheel slip information obtained from other sources, thereby increasing system robustness.

According to aspects, the configurable wheel slip limit is obtained based on a pre-determined relationship between tyre force and current wheel slip. This pre-determined relationship allows for optimizing vehicle operation, which is an advantage. A vehicle motion management control system may continuously or intermittently estimate the current tyre/road conditions using known techniques. The predetermined relationship can be established for a given vehicle type, or even for a given vehicle, thereby accounting for individual characteristics related to the vehicle for a more tailored control strategy, which is an advantage.

According to aspects, the control unit is arranged to obtain an estimated road friction coefficient and the configurable wheel slip limit is obtained based on a pre-determined lookup table indexed by the estimated road friction coefficient. Thus, the vehicle operation is adjusted in dependence of current road friction, thereby increasing control accuracy.

According to aspects, the current wheel state comprises an estimated road friction coefficient and an estimated tyre normal force for each driven wheel. Each wheel slip control module is arranged to determine the obtainable torque based on a relationship $$T_i = \mu_i * F_{zi} * r_{wi}$$

where $r_{wi}$ is a wheel radius of the i:th driven wheel. This way to determine obtainable torque can be used separately or in combination with other methods, thereby improving system robustness.

According to aspects, each wheel slip control module is arranged to obtain a capability message from a wheel end module associated with the respective driven wheel, wherein the capability message comprises the obtainable torque. This way some of the system complexity can be shifted down to the MSD, which may be an advantage in some scenarios. For instance, controller sampling and data transmission between units may be simplified since the system complexity is shifted closer to the wheel. In particular, the data traffic between MSD and VMM may be reduced.

According to aspects, the first and second driven wheels are arranged to be braked by respective first and second service brakes. Each service brake is controlled by a respective wheel end module to maintain wheel slip below a configured wheel slip limit. The control module is arranged to configure the wheel slip limits. This gives the control module additional options for optimizing vehicle performance, as will be explained in the following.

According to aspects, the control unit is also arranged to detect a split friction condition. Each wheel slip control module is arranged to configure a torque to be applied by a corresponding service brake to maintain positive wheel slip below a wheel slip limit, when having detected a split friction condition. This way vehicle operation in split friction conditions is improved, which is an advantage.

According to aspects, the control unit is also arranged to reduce the requested torque from the electrical machine in case both of the wheel slip control modules configures a torque to be applied by the corresponding service brake in response to a positive wheel slip above the configured wheel slip limit. This way vehicle operation in split friction conditions is further improved, which is an advantage.

According to aspects, the control unit is arranged to configure a torque to be applied by the corresponding service brake based on a requested curvature to modify an understeer gradient associated with the vehicle in dependence of the requested curvature. This allows the vehicle to better negotiate curves, which is an advantage.

According to aspects, the control unit is arranged to configure a higher wheel slip limit for the service brakes compared to a wheel slip limit of the electric machine. This way the service brakes assume a back-up role to safeguard vehicle operation which will be explained in more detail below.

There is also disclosed herein methods, computer programs, computer readable media, computer program products, brake systems and vehicles associated with the above discussed advantages.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

With reference to the appended drawings, below follows a more detailed description of embodiments of the invention cited as examples. In the drawings:

FIG. 7 is a flow chart illustrating methods;

FIG. 8 schematically illustrates a control unit; and

FIG. 9 shows an example computer program product.

DETAILED DESCRIPTION OF EXAMPLE EMBODIMENTS OF THE INVENTION

Figures 1A, 1B, 2:
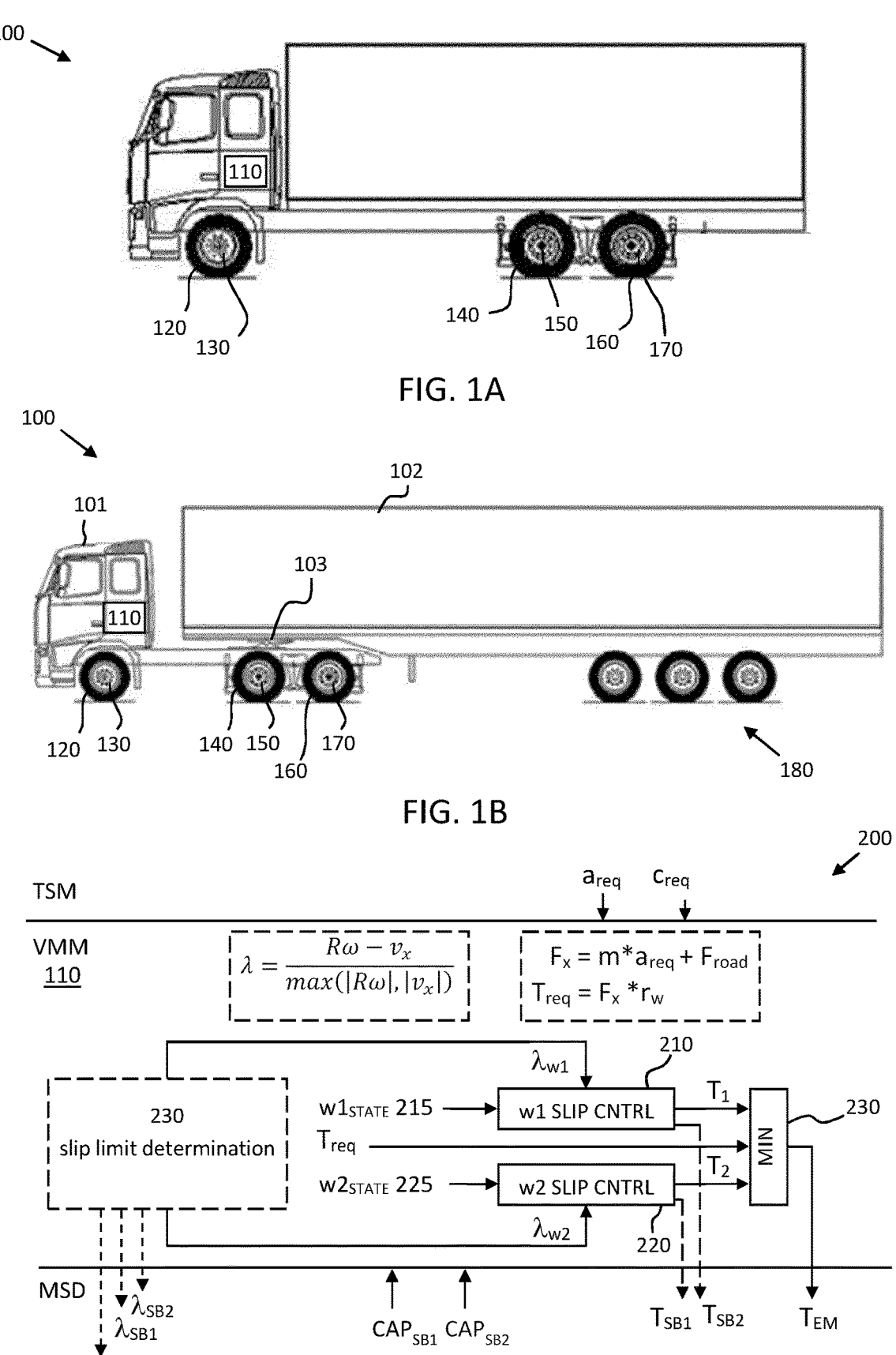
FIGS. 1A-B schematically illustrate some example heavy duty vehicles.
FIG. 2 shows an example vehicle control system stack.

The invention will now be described more fully hereinafter with reference to the accompanying drawings, in which certain aspects of the invention are shown. This invention may, however, be embodied in many different forms and should not be construed as limited to the embodiments and aspects set forth herein; rather, these embodiments are provided by way of example so that this disclosure will be thorough and complete, and will fully convey the scope of the invention to those skilled in the art. Like numbers refer to like elements throughout the description.

It is to be understood that the present invention is not limited to the embodiments described herein and illustrated in the drawings; rather, the skilled person will recognize that many changes and modifications may be made within the scope of the appended claims.

FIGS. 1A and 1B illustrate example vehicles 100 for cargo transport where the techniques disclosed herein can be applied with advantage. FIG. 1A shows a truck supported on wheels 120, 140, and 160, some of which are driven wheels.

FIG. 1B shows a semitrailer vehicle where a tractor unit 101 tows a trailer unit 102. The front part of the trailer unit 102 is supported by a fifth wheel connection 103, while the rear part of the trailer unit 102 is supported on a set of trailer wheels 180.

Each wheel, or at least a majority of the wheels, is associated with a respective wheel service brake 130, 150, 170 (trailer unit wheel brakes are not indicated in FIGS. 1A-1B. This wheel service brake may, e.g., be a pneumatically actuated disc brake or drum brake. The wheel brakes are controlled by brake controllers. Herein, the terms brake controller, brake modulator, and wheel end module will be used interchangeably. They are all to be interpreted as a device which controls applied braking force and potentially also local slip control on at least one wheel of a vehicle, such as the vehicle 100. Each of the wheel brake controllers is communicatively coupled to a control unit 110, allowing the control unit to communicate with the brake controllers, and thereby control vehicle braking. This control unit may potentially comprise a number of sub-units distributed across the vehicle, or it can be a single physical unit. The control unit 110 may, e.g. allocate a required brake force between wheels to maintain vehicle stability, and even to actively modify vehicle dynamics such as understeer gradient. The control unit 110 may also be part of a larger vehicle control system comprising additional control layers, as will be discussed in more detail below in connection to FIG. 2.

Some of the wheels on the vehicles 100 are driven by one or more electrical machines via a differential drive arrangement. Although the disclosure is mainly focused on open differentials, other forms of differential drive arrangements are also applicable within the scope of the current discussion.

FIG. 2 schematically shows a control stack 200 in which various vehicle control functions are incorporated. A traffic situation management (TSM) layer plans vehicle operation with a time horizon of, e.g., 10 seconds, either by driver input from steering wheel, pedals and the like, or from automated driving functions. Advanced driver assistance (ADAS) systems may also provide input to the TSM layer. The techniques disclosed herein support both manual, assisted and automated driving. The TSM time frame for instance corresponds to the time it takes for the vehicle to negotiate a curve, i.e., to transition from driving straight to entering the curve and then exiting the curve again. The vehicle operation comprises vehicle maneuvers that in turn are associated with acceleration profiles and curvature profiles. The TSM layer continuously requests the desired acceleration profiles ($a_{req}$) and curvature profiles ($c_{req}$) from a vehicle motion management (VMM) layer. The VMM layer operates with a time horizon of about 1 second or so, and continuously transforms the acceleration profiles and curvature profiles into control commands for the various motion support device (MSD) functions on the vehicle. One such MSD function are the service brakes 130, 140, 160. Another MSD function is the electric machine or electric machines arranged to power the vehicle 100. The translation between TSM requests (such as acceleration profiles and curvatures) and MSD actions by the VMM layer are known in general and will therefore not be discussed in more detail herein.

The interface between VMM and MSD may, e.g., comprise configured service brake wheel slip limits $\lambda_{SB1}$, $\lambda_{SB2}$, configured electric machine wheel slip limits $\lambda_{EM}$, requested service brake torque values $T_{SB1}$, $T_{SB2}$, and requested electrical machine torque $T_{EM}$. The interface may also comprise a requested wheel speed or engine speed $\omega_{EM}$ from the electric machine. The MSD functions then normally feed status and current capabilities back to the VMM layer, such as the service brake current capabilities $CAP_{SB1}$ and $CAP_{SB2}$ shown in FIG. 2. This status may, e.g., comprise monitored wheel slip values, detected peak wheel slip, estimated road friction coefficients, and the like. According to some aspects the capability messages comprise obtainable torques by a given wheel, which value has been estimated at the MSD layer.

The obtainable torques may comprise a peak torque value which can be maintained for a limited period of time, and a continuous torque value which can be sustained for longer periods of time. The capability message may also comprise a time period associated with a time duration over which the peak torque can be maintained.

In FIG. 2, the service brake wheel slip limits $\lambda_{SB1}$, $\lambda_{SB2}$, the electric machine wheel slip limits $\lambda_{EM}$, the requested wheel speed or engine speed $\omega_{EM}$, and the requested service brake torque values $T_{SB1}$, $T_{SB2}$ are optional and therefore not required for basic functionality of the techniques described herein.

According to an example operation, the VMM function 110 shown in FIG. 2 first determines a required longitudinal force $Fx = m*a_{req} + F_{road}$ to meet the requests from the TSM layer, based on vehicle mass m, the requested acceleration $a_{req}$ and road resistance $F_{road}$. The road resistance $F_{road}$ may be significant in some driving scenarios, and possible to ignore in other driving scenarios.

The torque corresponding to the required longitudinal force Fx to satisfy TSM layer requests can then be determined as $T_{req} = Fx*r_w$, where $r_w$ is a wheel radius.

It is appreciated that these rudimentary calculations and vehicle models are merely presented by way of example. More advanced models can of course be used with advantage in order to improve model accuracy and overall vehicle control. However, in the interest of brevity, only these rudimentary models will be used herein, and it is noted that more advanced methods are known.

The required torque $T_{req}$ is then compared to obtainable torque values determined by wheel slip control modules 210, 220 for each of the driven wheels w1, w2, and a smallest torque value $T_{EM}$ is obtained as the minimum of the obtainable torques and the required torque. This torque value $T_{EM}$ is forwarded to the MSD layer, where it is used to control electrical machine torque. It is noted that the 'min' function can be replaced by some more advanced function that determines the torque sent to the electric machine based on the required torque and the obtainable torque values.

This function may, e.g., be a weighted combination which favors the smallest torque value by assigning weights accordingly. The function can also involve filtering over time to suppress spurious torque values. Thus, herein to request a torque $T_{EM}$ from an electrical machine which 'corresponds to' the smallest torque out of the obtainable torques for each driven wheel and the required torque may involve other functions than just a function configured to select the smallest value.

The obtainable torque values $T_1$ and $T_2$ represent how much torque a given wheel can support without entering into severe wheel slip. The actual value is compensated for any geared transmissions and also for the effect of the differential drive arrangement. Thus, the output obtainable torque is normally multiplied by a factor of two to account for the differential drive arrangement which divides torque between the two drive wheels.

This obtainable torque can be determined or estimated in a number of different ways. Also, the obtainable torque can be independently estimated based on a plurality of different information sources. These different estimates can then be merged into a more accurate value for the obtainable torque.

For instance, each wheel slip control module 210, 220 may obtain vehicle velocity $v_x$ from on-board vehicle sensors such as global positioning system receivers, radar sensors, vision-based sensors, and lidar, and wheel rotational velocity $\omega$ from wheel speed sensors (which can be converted into wheel speed $R\omega$ in meters per second if the wheel radius R is known, which of course is normally the case). Current wheel slip can then be determined and compared to a configured wheel slip limit $\lambda_{w1}$, $\lambda_{w2}$ for the wheel. These wheel slip limits can be configured by a slip limit determination module 230. Thus, if a given wheel is slipping and the configured wheel slip limit is breached (or about to be breached), then the obtainable torque $T_1/T_2$ by the wheel can be reduced. Thus, as will be explained below in connection to FIG. 4, a wheel slip limit $\lambda_{w1}$, $\lambda_{w2}$ can often be established which indicates how much wheel slip that can be tolerated by the vehicle in different situations. The obtainable torque $T_1$, $T_2$ can then be adjusted to keep current wheel slip below the wheel slip limit.

The obtainable torque values $T_1$, $T_2$ for each wheel can also be determined based on estimated road friction conditions and the known fundamental relationship $F_{xi} \leq \mu_i * F_{zi}$, where $F_{xi}$ is the longitudinal force at wheel i, $\mu_i$ represents an estimated road friction coefficient associated with the i:th wheel, and $F_{zi}$ is an estimated tyre normal force for the i:th wheel, as $$T_i = \mu_i * F_{zi} * r_w$$

where $T_i$ is the obtainable torque value for wheel i and $r_w$ is a wheel radius of wheel i. This obtainable torque value can be used as the obtainable torque $T_1/T_2$ for a given wheel. This obtainable torque value can also be combined with the obtainable torque obtained from wheel slip calculation discussed above. For instance, $T_1/T_2$ can be determined as the smallest of the obtainable torque obtained from the relationship relationship $F_{xi} \leq \mu_i * F_{zi}$ an the obtainable torque determined based on current wheel slip and a configured wheel slip limit $\lambda_{w1}$, $\lambda_{w2}$ by the slip limit determination module 230.

The capability information received from an MSD, such as the service brake capability signals $CAP_{SB1}$ and $CAP_{SB1}$, normally comprises minimum and maximum achievable torque assuming 'dry road conditions', i.e., the maximum torque capability sent from a wheel brake will not decrease when it is on a slippery road or if the normal load is small. It instead gives this limit of the actuator itself, so it would only go down if for instance the brake is very hot and cannot generate torque. A wheel brake MSD of the present disclosure, however, optionally also sends its own estimate of the current tyre-road properties, as a separate signal. These tyre road friction properties can then be used by the slip limit determination module 230 along with other information related to the vehicle 100 and its components and/or to the current road conditions to calculate suitable slip limits to be imposed on the left and right hand wheels of the driven axles.

The obtainable torque values can furthermore be obtained directly from the MSD layer as part of the capability reports $CAP_{SB1}$ and $CAP_{SB2}$. Some of the more advanced wheel end modules (WEM) maintain relatively detailed data related to current wheel state, including current obtainable torque by the wheel. This obtainable torque will be a function of road friction conditions and normal force, but also of wheel wear, type of tyre and so on. Again, the obtainable torque values $T_1/T_2$ sent to the 'min' function in FIG. 2 can be combined as a function of the different torque values determined based on a number of different information sources, where the capability reports represent on source. The determinations may also, as noted above, comprise peak torque capability with associated time periods.

Methods for estimating obtainable longitudinal force and/or torque by a tyre are known in general and will therefore not be discussed in more detail herein.

In the example 200 there are two driven wheels, but the concepts disclosed herein are applicable also to drive arrangements with more than two wheels on a single axle. The arrangements can also be implemented on, e.g., on an electrically powered dolly unit or the like.

Torque can be both positive (as in propulsion of the vehicle) and negative (as in vehicle braking). The techniques disclosed herein can be applied for both positive and negative torques, and for both positive and negative wheel slips. In fact, according to some aspects that will be discussed below, each of the wheel slip control modules 210, 220 may request braking by issuing a negative brake torque request $T_{SB1}$, $T_{SB2}$ even if the acceleration request $T_{EM}$ is positive. This way uneven friction conditions can be handled without differential locking, which is an advantage.

It is common to have open differentials comprising a differential locking mechanism which locks the wheel speeds to be equal to manage to transfer uneven propulsive and braking wheel force during uneven friction conditions in the left and right side wheel. The main disadvantage with differential locking is that the wheel speeds become equal. This means that turning radius and maneuverability is reduced. An illustrative example is uphill driving during a turn. It may be desired to go uphill so the differential is locked, but this then results in reduced maneuverability since turning becomes more difficult.

The brake torque requests $T_{SB1}$ and $T_{SB2}$ shown in FIG. 2 are normally disabled during normal operation. However, if a severe 'split friction' situation is detected during propulsion, then $T_{SB1}$ and $T_{SB2}$ may be used to transfer torque away from the low friction wheel by applying braking to the low-friction wheel. This way a higher overall propulsion torque can be reached, which is an advantage. These control signal also increase vehicle controllability, giving the VMM additional options for vehicle control. The requested wheel speed or engine speed $\omega_{EM}$ also provides additional control options, which is an advantage.

Figure 3:
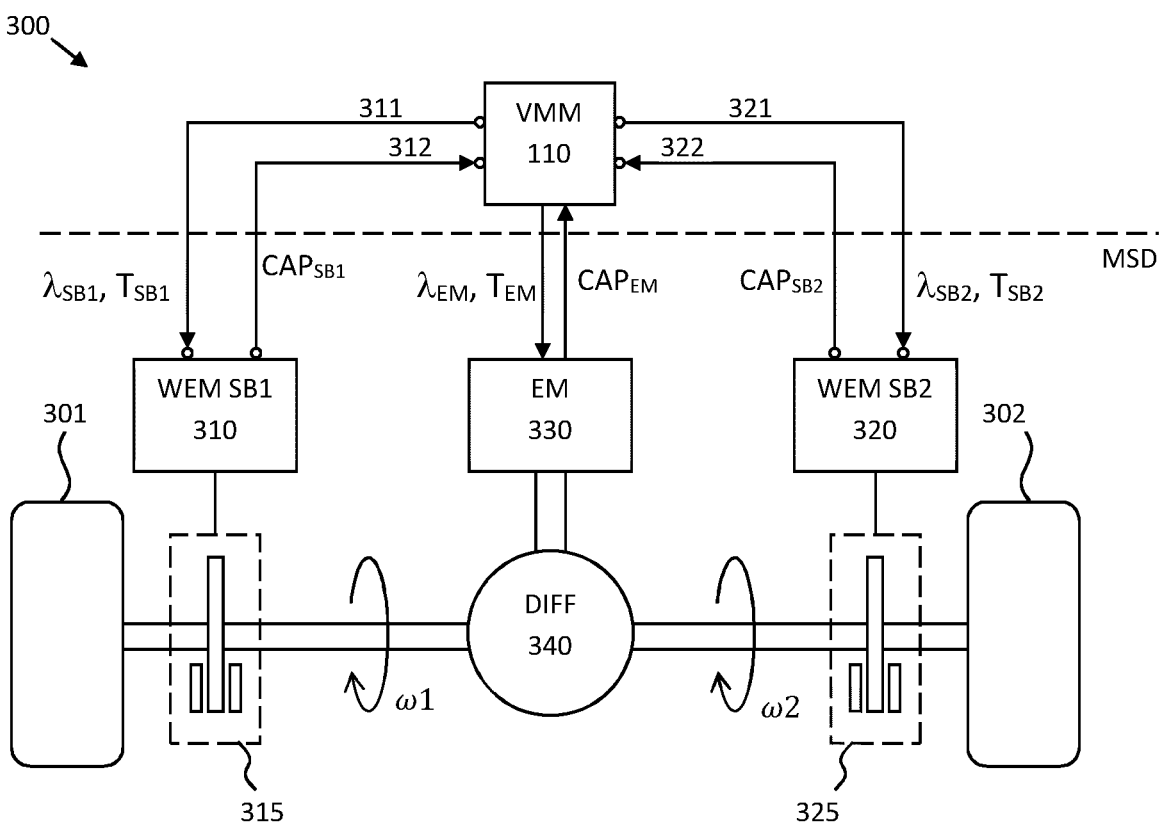
FIG. 3 shows an example vehicle drive arrangement.

FIG. 3 illustrates a brake and propulsion control system 300 for a pair of wheels 301, 302. The system 300 comprises a first service brake wheel end module (WEM SB1) 310 arranged to control wheel braking on a first wheel 301 by a first service brake actuator 315, here exemplified by a disc brake. The system also comprises a second service brake wheel end module (WEM SB2) 320 arranged to control wheel braking on a second wheel 302 by a second service brake actuator 325. Each WEM is configured to receive 311, 321 respective wheel slip limits $\lambda_{SB1}$, $\lambda_{SB2}$, and requested service brake torque values $T_{SB1}$, $T_{SB2}$, from a VMM module 110.

The WEMs are also arranged to report back status and capabilities (CAPss1 and CAPss2) 312, 322 to the VMM 110, as discussed above in connection to FIG. 2.

The propulsion control system comprises one or more electric machines EM 330 arranged to drive the first and the second wheel via a differential 340. The two wheels are thus driven by the same torque but may have different wheel speeds $\omega_1$ and $\omega_2$.

It is appreciated that the two WEMs 310, 320 may be comprised in a single physical unit, or configured as separate physical units.

Longitudinal wheel slip $\lambda$ may, in accordance with SAE J670 (SAE Vehicle Dynamics Standards Committee, Jan. 24, 2008) be defined as $$\lambda = \frac{R\omega - v_x}{\max(|R\omega|, |v_x|)}$$

where R is an effective wheel radius in meters, $\omega$ is the angular velocity of the wheel, and $v_x$ is the longitudinal speed of the wheel (in the coordinate system of the wheel). Thus, $\lambda$ is bounded between $-1$ and 1 and quantifies how much the wheel is slipping with respect to the road surface.

It is noted that wheel slip essentially relates to a speed difference between a wheel and the vehicle (zero slip means that the wheel and vehicle are covering ground at the same speed). It is therefore appreciated that the herein disclosed techniques can be used with advantage together with most measures of speed difference between wheel and vehicle.

The vehicle control unit 110 maintains information on $v_x$ (in the reference frame of the wheel), while a wheel speed sensor or the like can be used to determine ω. Notably, in the following, when limits on wheel slip are discussed, it is the magnitude or absolute value of the wheel slip which is limited. I.e., an increased wheel slip limit may either refer to a larger positive allowed wheel slip or a smaller negative allowed wheel slip. The present disclosure mainly considers braking, i.e., the wheel slip is normally negative herein, since $v_x > R\omega$ during braking.

Modern service brake systems and also some electrical machines are capable of fine grained slip control. For instance, some modern brake controllers are able to keep wheel slip λ within say +/−0.02 of some nominal value.

Thus, the first and second driven wheels 301, 302 are arranged to be braked by respective first and second service brakes 315, 325, each service brake 315, 325 being controlled by a respective wheel end module, WEM, 310, 320 to maintain wheel slip below a configured wheel slip limit $\lambda_{SB1}$, $\lambda_{SB2}$. With reference to FIG. 2, the control module 110 is arranged to configure 230 the wheel slip limits $\lambda_{SB1}$, $\lambda_{SB2}$, $\lambda_{EM}$, according to techniques will be discussed in more detail below.

The vehicle control unit 110, e.g., a vehicle motion management (VMM) system, sends brake requests comprising, e.g., requested brake torque and wheel slip magnitude limit, and receives back data capability data related to the current capabilities of the wheel end module. The capability data may optionally comprise, e.g., measured wheel slip, peak measured wheel slip, current braking capability in terms of, e.g., brake torque, and in some cases also estimated road friction coefficients. As discussed above, the capability may also comprise peak torque capability and an associated time period for which the peak torque can be sustained by the system.

A WEM then controls braking according to the requested brake torque while keeping wheel slip magnitude below the set wheel slip magnitude limit. This is made possible by the data supplied from the control unit 110 on, e.g., vehicle speed in the frame of reference of the wheel. If wheel slip magnitude exceeds the set slip limit, a slip control strategy which may comprise reducing the wheel torque generated in the brake system is activated such that the wheel recovers to a slip value equal to or less than the set wheel slip magnitude limit. The slip control function can be incorporated in the VMM or into the WEM or in both. According to some aspects, the VMM-based slip control loop uses one slip limit and the WEM uses a larger one. This way the WEM acts as a safety net if VMM fails to prevent excessive wheel lock.

According to some aspects, the control unit 110 is arranged to configure a higher wheel slip limit $\lambda_{SB1}$, $\lambda_{SB2}$ for the service brakes 315, 325 compared to a wheel slip limit of the electric machine $\lambda_{EM}$. This effectively means that the service brakes are used as back-up and will handle more severe wheel slip conditions which the electric machine has not been able to control successfully. This results in a more robust control system. With reference to FIG. 2, the slip limits $\lambda_{w1}$ and $\lambda_{w2}$ sent to the wheel slip control modules 210 and 220 are normally the lowest of all configured slip limits. This means that the slip controllers 210, 220 are first to intervene in a wheel slip situation. Ideally, this slip control is sufficient, such that the other slip control functions of the vehicle 100 do not need to act to reduce wheel slip.

For the case where a braking request is active (where $T_{req}$ in FIG. 2 is negative) the next 'highest' slip limit should normally be that sent to the electric machine, i.e., $\lambda_{EM}$, as the EM 330 has the most freedom to prevent an imminent wheel lock (since it can directly reduce the braking torque applied by the electric machine).

Optionally a wheel motor speed request $\omega_{EM}$ can be sent to the electric machine, in which case the VMM would perform slip control.

The highest wheel slip limit should normally be that sent to the wheel brakes, i.e., $\lambda_{SB1}$, $\lambda_{SB2}$, as in this situation with braking through the EM active the service brakes will have very little possibility to actually reduce the braking torque at the wheel. If the slip limit at either wheel brake is exceeded this should be reported back to the VMM since in this case something is clearly wrong with braking control of the EM, and that a different braking strategy may be needed. For instance, a switch to braking with service brakes only may be preferred in case this situation is detected.

For the case where positive acceleration is requested (where $T_{req}$ in FIG. 2 is positive) the slip limits ($\lambda_{w1}$, $\lambda_{w2}$) used by the wheel slip control modules 210 and 220 should normally be the smallest (making those slip controllers the most active in controlling wheel slip). A slightly higher slip limit $\lambda_{EM}$ should normally be sent to the EM, and the highest slip limits $\lambda_{SB1}$, $\lambda_{SB2}$ should normally be sent to the service brake WEMs 310, 320. For the propulsion case it may according to some aspects be acceptable if one service brake momentarily goes into slip control mode where it modifies applied torque to reduce wheel slip, but if both service brakes become active then some other intervention may be required.

It is appreciated that, for the propulsion case (where $T_{req}$ in FIG. 2 is positive), the service brakes 315, 325 can intervene to prevent excessive slip even if the EM continues to generate too much torque, but for the braking case (where $T_{req}$ in FIG. 2 is negative) the service brakes can only reduce their own braking torque in response to excessive wheel slip. If the EM 330 continues to brake hard the wheels could still lock—hence the slip limit sent to the EM is configured to avoid this situation.

Figure 4:
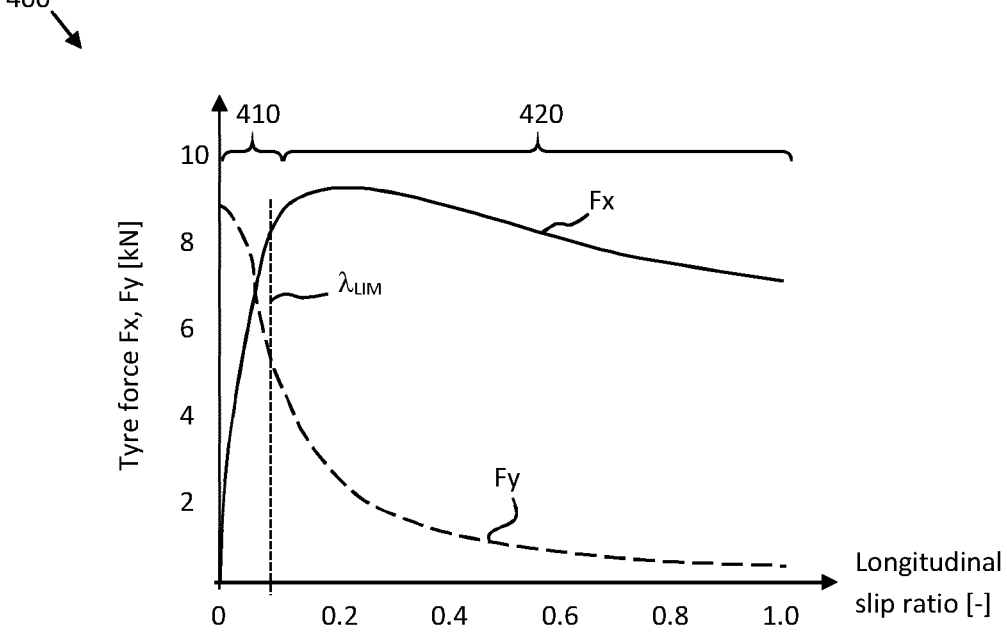
FIG. 4 is a graph illustrating tyre force vs. slip ratio.

FIG. 4 is a graph showing achievable tyre force as function of wheel slip. The longitudinal obtainable tyre force Fx shows an almost linearly increasing part 410 for small wheel slips, followed by a more non-linear behaviour 420 for larger wheel slips. The obtainable lateral tyre force Fy decreases rapidly even at relatively small wheel slips. It is desirable to maintain vehicle operation in the linear region 410, where the obtainable longitudinal force is easier to predict, and where lateral tyre force can be generated if needed. To ensure operation in this region, a wheel slip limit $\lambda_{LIM}$ on the order of, e.g., 0.1, can be imposed on the WEM. If maximum longitudinal force is desired, and no significant lateral forces are needed, then the wheel slip limit can be increased to perhaps 0.3.

A key concept of the techniques disclosed herein is to not send too high torque requests to the electric machine 330, since this may result in severe wheel slip on one or both sides of the vehicle 100. This is why the requested wheel torque is compared to the obtainable wheel torque as determined by the two wheel slip control modules 210, 220 which were discussed above in connection to FIG. 2.

To summarize, FIGS. 2 and 3 show a control unit 110 for a heavy duty vehicle 100. The vehicle comprises an electric machine 330 connected to first and second driven wheels 301, 302 via a differential 340. The control unit 110 comprises a first wheel slip control module 210 associated with the first driven wheel, and a second wheel slip control module 220 associated with the second driven wheel, where each wheel slip control module 210, 220 is arranged to determine an obtainable torque $T_1$, $T_2$ by the respective wheel based on a current wheel state 215, 225. The control unit 110 is arranged to determine a required torque $T_{req}$ to satisfy a requested acceleration profile $a_{req}$ by the vehicle 100, and to request a torque $T_{EM}$ from the electrical machine 330 corresponding to the smallest torque 230 out of the obtainable torques $T_1$, $T_2$ for each driven wheel 301, 302 and the required torque $T_{req}$.

Methods for determining required torque for satisfying a requested acceleration profile, and/or a requested curvature, are known and will therefore not be discussed in more detail herein. The acceleration profile and curvature may be the result of operating the vehicle autonomously, or they may be the result of a driver manual input (acceleration pedal, brake pedal, and steering wheel inputs).

As mentioned above, there are many different ways in which the obtainable torque for each wheel can be established. These methods may be used as stand-alone methods, or the different methods can be combined in order to obtain more robust obtainable torque values. For instance, a weighted combination of the torque values obtained by the different methods can be used as the final obtainable torque value.

According to one such example, the current wheel state 215, 225 (see FIG. 2) comprises wheel speed Rω. The wheel speed can, for instance, be obtained from a wheel speed sensor configured to measure rotational velocity in terms of revolutions per second, which can be translated into wheel speed based on a known wheel radius R. Each wheel slip control module 210, 220 is also arranged to obtain a vehicle velocity $v_x$, to determine a current wheel slip A, and to determine the obtainable torque $T_1$, $T_2$ based on a comparison between the current wheel slip and a configurable wheel slip limit $\lambda_{LIM}$. This configurable wheel slip limit $\lambda_{LIM}$ was exemplified above in FIG. 2 by the configured wheel slip limits $\lambda_{w1}$ and $\lambda_{w2}$.

Thus, if the current wheel slip is above the slip limit, the obtainable torque is reduced until the current wheel slip is no longer above the slip limit. The obtainable torque values may be determined with some margin, i.e., the obtainable torque can be reduced some time before the current wheel slip actually breaches the configured wheel slip limit. According to another example, the control algorithm for determining obtainable torque can operate based on detected peak wheel slip instead of current wheel slip. Peak wheel slip may, e.g., be defined as the largest detected wheel slip over some time window. The configurable wheel slip limit will be discussed in more detail below.

According to another such example, the current wheel state 215, 225 comprises a current wheel slip value λ obtained by the wheel slip control module 210, 220 as part of the capability message (CAP$_{SB1}$, CAP$_{SB2}$, see FIG. 2) received from a wheel end module 310, 320 associated with the respective wheel. Each wheel slip control module 210, 220 is arranged to determine the obtainable torque $T_1$, $T_2$ based on a comparison between the current wheel slip and the configurable wheel slip $\lambda_{LIM}$. The configurable wheel slip was exemplified by $\lambda_{w1}$ and as $\lambda_{w2}$ in FIG. 2 above. The control of the obtainable torque output may be performed as discussed above, i.e., the obtainable torque can be adjusted by a control algorithm such that the current wheel slip (or peak wheel slip) does not exceed the slip limit.

The configurable wheel slip limit $\lambda_{LIM}$ can, for instance, be obtained based on a pre-determined relationship 400 between tyre force and current wheel slip λ, such as that illustrated in FIG. 4. For instance, if a significant curvature is requested from the TSM layer, then the VMM must deliver a vehicle control which is able to provide lateral forces $F_y$. The configurable wheel slip limit $\lambda_{LIM}$ is then preferably set rather low, e.g., on the order of 0.1, where lateral forces can be generated. On the other hand, if the vehicle is driving straight and needs to generate maximum longitudinal force $F_y$, then a larger wheel slip limit may be preferred, e.g., on the order of 0.2 where longitudinal force is at its peak.

The relationship in FIG. 4 may be pre-determined based on laboratory testing or based on computer simulation of vehicle dynamics. The relationship can also be estimated continuously and thus updated as the vehicle 100 operates. The relationship can be established for a given vehicle type or even for an individual vehicle.

The control unit 110 may also be arranged to obtain an estimated road friction coefficient $\mu_i$ using known methods. The configurable wheel slip limit $\lambda_{LIM}$ can then be obtained based on a pre-determined lookup table indexed by the estimated road friction coefficient $\mu_i$. The look-up table may be pre-determined based on laboratory testing or based on computer simulation of vehicle dynamics. The look-up table can also be estimated continuously as the vehicle operates.

Another example technique for determining obtainable torque is based on the current wheel state 215, 225 comprising an estimated road friction coefficient $\mu_i$ and an estimated tyre normal force $F_{zi}$ for each driven wheel. Road friction and tyre normal force can be estimated based on known methods. Each wheel slip control module 210, 220 is then arranged to determine the obtainable torque $T_1$, $T_2$ based on a relationship $$T_i = \mu_i * F_{zi} * r_{wi}$$

where $r_{wi}$ is a wheel radius of the i:th driven wheel. A margin can of course also be used here, i.e., the obtainable torque can be determined as $$T_i = \alpha * \mu_i * F_{zi} * r_{wi}$$

where α is a margin factor that can, e.g., assume values on the order of 0.7 to 0.95. This relationship comes from the fundamental limit on longitudinal force $F_{yi}$ for the i:th wheel set by the road friction coefficient and the normal force for that wheel $$F_{yi} \leq \mu_i * F_{zi}$$

According to other aspects, each wheel slip control module 210, 220 is arranged to obtain a capability message CAP$_{SB1}$, CAP$_{SB2}$ from a wheel end module 310, 320 associated with the respective driven wheel 301, 302, wherein the capability message CAP$_{SB1}$, CAP$_{SB2}$ comprises the obtainable torque $T_1$, $T_2$. In this case the obtainable torque has already been estimated or otherwise determined at the MSD layer, and is just reported back up to the VMM layer. The wheel slip control modules may then just forward the obtainable torque reported from the MSD layer.

A problem with differential drive arrangements is that wheel speed tends to increase significantly on one side of the vehicle if the vehicle encounters a split friction scenario where one side of the road has a reduced friction coefficient compared to the other side of the road. This may, for instance, be the case if the vehicle drives over some ice or if one side of the vehicle is on a muddy road shoulder. Split friction conditions can be detected by means of comparing, e.g., the wheel speeds a) and $\omega_2$ indicated in FIG. 3. When encountering a split friction condition during propulsion, where one or more wheels start to slip, i.e., too large positive slip, the VMM 110 may optionally issue a brake command ($T_{SB1}$ or $T_{SB2}$) by requesting negative torque from the service brake 315, 325 associated with the slipping wheel. This applied negative torque will slow down the slipping wheel and effectively transfer power over to the wheel which is not slipping. The amount of slipping allowed on one side of the vehicle depends on the driving scenario. With reference again to FIG. 4, if maximum propulsion force is desired, then a wheel slip limit on the order of 0.2-0.3 or so may be configured. On the other hand, if lateral forces are needed, and/or if linear vehicle behaviours is desired, then the wheel slip limit is configured lower, e.g., around 0.1. To summarize, according to some aspects, the control unit 110 is arranged to detect a split friction condition. Each wheel slip control module 210, 220 is arranged to configure a torque $T_{SB1}$, $T_{SB2}$ to be applied by a corresponding service brake 315, 325 to maintain positive wheel slip below a wheel slip limit $\lambda_{SB1}$, $\lambda_{SB2}$, when having detected a split friction condition.

Advantageously, this type of selective application of torque during propulsion voids the need for a differential lock arrangement.

Optionally, the control unit 110 is also arranged to reduce the requested torque $T_{EM}$ from the electrical machine 330 in case both of the wheel slip control modules 210, 220 configures a torque $T_{SB1}$, $T_{SB2}$ to be applied by the corresponding service brake 315, 325 in response to a positive wheel slip above the configured wheel slip limit $\lambda_{SB1}$, $\lambda_{SB2}$. Naturally, it does not make sense to brake both wheels while the electric machine at the same time drives the wheels.

It is appreciated that the service brakes can be used to actively modify an understeer gradient of the vehicle 100. If the vehicle enters a curve, the VMM normally has several options for how to successfully provide the requested acceleration profile and curvature that is requested by the TSM layer in order to successfully negotiate the curve. On such option is of course to apply steering. However, the service brakes can also be used to turn the vehicle, or to adjust the understeer gradient of the vehicle in order to facilitate curve taking. According to some aspects, the control unit is arranged to configure a torque $T_{SB1}$, $T_{SB2}$ to be applied by the corresponding service brake 315, 325 based on a requested curvature $c_{req}$ to modify an understeer gradient associated with the vehicle 100 in dependence of the requested curvature $c_{req}$. Standard terminology used to describe understeer and oversteer are defined by the Society of Automotive Engineers (SAE) in document J670 and by the International Organization for Standardization (ISO) in document 8855. By these terms, understeer and oversteer are based on differences in steady-state conditions where the vehicle is following a constant-radius path at a constant speed with a constant steering wheel angle, on a flat and level surface.

Understeer and oversteer are defined by an understeer gradient (K) that is a measure of how the steering needed for a steady turn changes as a function of lateral acceleration. Steering at a steady speed is compared to the steering that would be needed to follow the same circular path at low speed. The low-speed steering for a given radius of turn is called Ackermann steer. The vehicle has a positive understeer gradient if the difference between required steer and the Ackermann steer increases with respect to incremental increases in lateral acceleration. The vehicle has a negative gradient if the difference in steer decreases with respect to incremental increases in lateral acceleration. Vehicles are inherently nonlinear systems, and it is normal for K to vary over the range of testing. It is possible for a vehicle to show understeer in some conditions and oversteer in others. Therefore, it is necessary to specify the speed and lateral acceleration whenever reporting understeer/oversteer characteristics.

Figure 5:
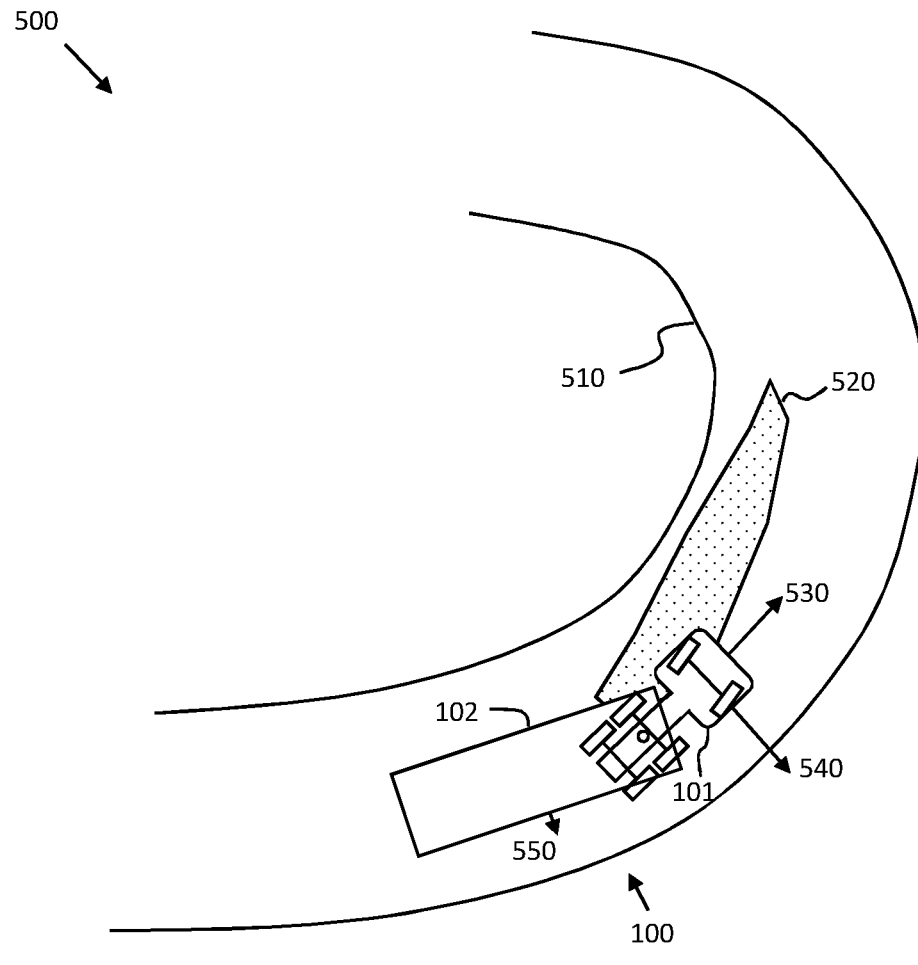
FIGS. 5-6 illustrate vehicle operating scenarios.
Figure 6:
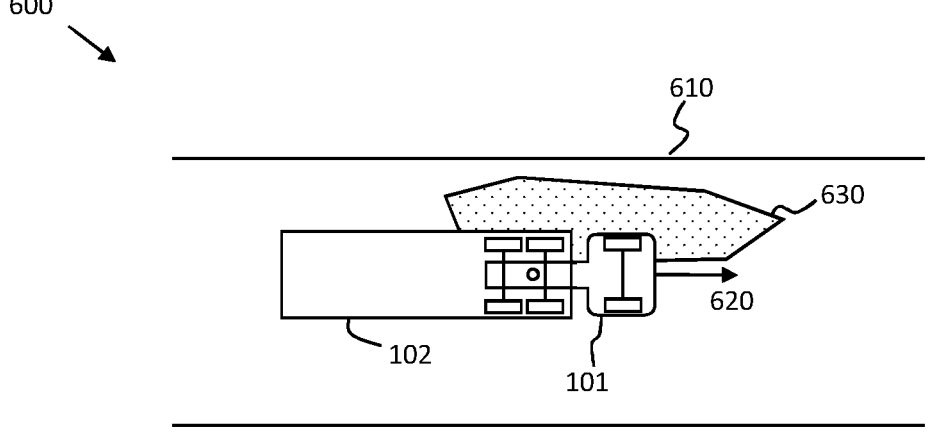

Some of the advantages of the disclosed techniques are exemplified in FIG. 5 and in FIG. 6. FIG. 5 illustrates a scenario 500 where a semi-trailer vehicle 100 comprising a tractor unit 101 and a trailer unit 102 is entering a rather steep curve 510. The tractor 101 is subject to a longitudinal force 530 and a significant lateral force 540, while the trailer unit 102 is subject to a less severe lateral force 550 due to not having fully committed to the curve yet. With reference to FIG. 4, it is important in this scenario to maintain wheel slip at a reasonably low level in order to be able to generate the required lateral forces 540, 550 (i.e., $F_y$ in FIG. 4). With reference to FIG. 2, the TSM layer is likely to request vehicle deceleration, i.e., braking, as the tractor 101 enters the curve 510. However, the left wheels on the tractor 101 are currently experiencing low friction conditions, due to a patch of ice on the road 520, which means that the obtainable torque on the left wheels of the tractor 101 is temporarily reduced. Had the torque request $T_{req}$ from the TSM layer (see FIG. 2) been allowed to propagate directly to the electric machine torque request $T_{EM}$, severe wheel slip on the left tractor wheels would have been likely. However, the wheel slip control module 210 associated with the left driven wheel of the tractor 101 now determines a reduced obtainable torque due to the low friction conditions, which causes a limitation of $T_{EM}$ as discussed above in connection to FIG. 2. Thus, severe wheel slip and a potential critical scenario is avoided.

In order to successfully negotiate the steep curve 510, the understeer gradient of the vehicle 100 can, according to the techniques disclosed herein, be actively modified. This can be achieved by requesting more braking on the inner (left) wheels compared to the outer (left) wheels. The VMM layer is able to detect when a modification of the understeer gradient is warranted, based on the requested acceleration profile and curvature from the TSM layer, as well as the status and capability reports received from the MSD layer.

FIG. 6 shows a scenario 600 where the semi-trailer vehicle 100 accelerates 620 along a straight stretch of road 610. The TSM layer here requests positive acceleration in order to increase vehicle velocity, and this request is translated by the VMM layer into a requirement for positive torque. However, the left wheels on the tractor unit 101 are again subject to reduced friction conditions, due to a spot of ice 630. Thus, the vehicle is in a split friction condition. Had the requested torque been allowed to propagate directly to the electric machine torque request $T_{EM}$, severe wheel slip on the left tractor wheels would again have been likely. However, due to the techniques disclosed herein, the left driven wheel/wheels report a reduced obtainable torque. Since acceleration is requested, and the right hand side wheels experience good friction conditions, the torque can be transferred to the high friction side by applying braking to the low friction side during electric machine propulsion.

FIG. 7 is a flow chart illustrating methods that summarize the above discussions. There is illustrated a method for requesting a torque $T_{EM}$ from an electrical machine 330 in a heavy duty vehicle 100. The electric machine 330 is connected to first and second driven wheels 301, 302 via a differential 340. The method comprises configuring S1 a first wheel slip control module 210 associated with the first driven wheel, and a second wheel slip control module 220 associated with the second driven wheel,
determining S2, by each wheel slip control module 210, 220, an obtainable torque $T_1$, $T_2$ for the respective wheel based on a current wheel state 215, 225, receiving S3 a requested acceleration profile $a_{req}$ by the vehicle 100, determining S4 a required torque $T_{req}$ to satisfy the requested acceleration profile $a_{req}$, and requesting S5 a torque $T_{EM}$ from the electrical machine 330 corresponding to the smallest torque 230 out of the obtainable torques $T_1$, $T_2$ for each driven wheel 301, 302 and the required torque $T_{req}$.

According to aspects, the method comprises S21 receiving a current wheel state 215, 225 comprising wheel speed $R\omega$, obtaining a vehicle velocity $v_x$, determining a current wheel slip $\lambda$, and determining the obtainable torque $T_1$, $T_2$ based on a comparison between the current wheel slip and a configurable wheel slip limit $\lambda_{LIM}$.

According to aspects, the method comprises S22 receiving a current wheel state 215, 225 comprising a current wheel slip value $\lambda$ obtained by the wheel slip control module 210, 220 as part of a capability message $CAP_{SB1}$, $CAP_{SB2}$ received from a wheel end module 310, 320 associated with the respective wheel, and determining the obtainable torque $T_1$, $T_2$ based on a comparison between the current wheel slip and a desired wheel slip $\lambda_{LIM}$.

According to aspects, the method comprises S221 obtaining the configurable wheel slip limit $\lambda_{LIM}$ based on a pre-determined relationship 400 between tyre force and current wheel slip $\lambda$.

According to aspects, the method comprises S222 obtaining an estimated road friction coefficient $\mu_i$, and obtaining the configurable wheel slip limit $\lambda_{LIM}$ based on a pre-determined lookup table indexed by the estimated road friction coefficient Pi.

According to aspects, the method comprises receiving S23 a current wheel state 215, 225 comprising an estimated road friction coefficient $\mu_i$ and an estimated tyre normal force $F_{zi}$ for each driven wheel, and determining the obtainable torque $T_1$, $T_2$ based on a relationship $$T_i = \mu_i * F_{zi} * r_{wi}$$

where $r_{wi}$ is a wheel radius of the i:th driven wheel. It is appreciated that both the WEM and the VMM can perform friction estimation either jointly or separately based on known techniques.

According to aspects, the method comprises obtaining S24 a capability message $CAP_{SB1}$, $CAP_{SB2}$ from a wheel end module 310, 320 associated with the respective driven wheel 301, 302, wherein the capability message $CAP_{SB1}$, $CAP_{SB2}$ comprises the obtainable torque $T_1$, $T_2$.

According to aspects, the method comprises detecting S6 a split friction condition, and configuring a torque $T_{SB1}$, $T_{SB2}$ to be applied by a corresponding service brake 315, 325 to maintain positive wheel slip below a wheel slip limit $\lambda_{SB1}$, $\lambda_{SB2}$, when having detected a split friction condition.

According to aspects, the method comprises reducing S61 the requested torque $T_{EM}$ from the electrical machine 330 in case both of the wheel slip control modules 210, 220 configures a torque $T_{SB1}$, $T_{SB2}$ to be applied by the corresponding service brake 315, 325 in response to a positive wheel slip above the configured wheel slip limit $\lambda_{SB1}$, $\lambda_{SB2}$.

According to aspects, the method comprises configuring S7 a torque $T_{SB1}$, $T_{SB2}$ to be applied by the corresponding service brake 315, 325 based on a requested curvature $c_{req}$ to modify an understeer gradient associated with the vehicle 100 in dependence of the requested curvature $c_{req}$.

The discussions above can also be phrased as a process comprising at least some of the steps 1-9 listed below.

1. First an acceleration request is interpreted either from driver accelerator pedal or from automated driving trajectory where a desired vehicle speed is to be maintained. The steering input from a manual driver can be interpreted as a desired curvature or from the trajectory of an autonomous system one can interpret the curvature request input.

2. The second step is to calculate total global force Fx, see FIG. 4.

3. Total braking torque can be estimated by $T_{req} = F_x * r_w$, where $r_w$ is a wheel radius.

4. Check friction estimation tyre/road from brake devices or similar systems to limit torque. This corresponds to the 'min' operation in FIG. 2.

5. Check if the braking is moderate, e.g., less than 0.3 g (can be adjusted based on the design of the electric propulsion system) and no electric braking wanted. If the electric drives can fulfill the total wheel braking torque, then use them and with the slip limit request. Slip control is handled using electric machines. The service brakes are only torque controlled. If the electric drives cannot fulfill the total wheel braking torque, then service brake torque is used with lining brake sensor coordination. Slip limit set only by service brake device control.

7. Check if the braking is between 0.3 g to 0.5 g deceleration. If this is the case, then use the braking device as the baseline braking with torque control and add electric machine for torque request and active slip control by electric machine. Use knowledge of estimated friction together with curvature request input for torque allocation between MSD layer devices. Use slip limitation left and right side calculation and take minimum of Treq=min(Tslipcrtrl1,Tslipctrl2, Treq). This slip control secures that no side is slipping larger than sliplim1 and sliplim2 sent to the slip limit controllers.

8. Check if braking harder than e.g. 0.5 g deceleration. If this is the case, then use only service brakes with both active torque control. Slip control is only performed using the service brakes.

9. Check if positive acceleration requested. If this is the case, then the wheel torque is controlled solely by electric machines torque and slip control is also based on the electric machine. Use the wheel slip controllers 210, 220 to add service brake torques to limit positive slip for traction on uneven friction. This is instead of locking the differential drive arrangement 340. Also use knowledge of estimated friction and tyre normal force together with curvature request input for torque allocation. The torque vectoring of the wheels allows to actively change the understeer gradient, e.g., during constant driving in curve. This is mainly only useful in uneven friction cases left right side or from linearizing the behavior of the vehicle.

FIG. 8 schematically illustrates, in terms of a number of functional units, the components of a control unit 110 according to embodiments of the discussions herein. This control unit 110 may be comprised in the vehicle 100, e.g., in the form of a VMM unit. Processing circuitry 810 is provided using any combination of one or more of a suitable central processing unit CPU, multiprocessor, microcontroller, digital signal processor DSP, etc., capable of executing software instructions stored in a computer program product, e.g. in the form of a storage medium 830. The processing circuitry 810 may further be provided as at least one application specific integrated circuit ASIC, or field programmable gate array FPGA.

Particularly, the processing circuitry 810 is configured to cause the control unit 110 to perform a set of operations, or steps, such as the methods discussed in connection to FIG. 7. For example, the storage medium 830 may store the set of operations, and the processing circuitry 810 may be configured to retrieve the set of operations from the storage medium 830 to cause the control unit 110 to perform the set of operations. The set of operations may be provided as a set of executable instructions. Thus, the processing circuitry 810 is thereby arranged to execute methods as herein disclosed.

The storage medium 830 may also comprise persistent storage, which, for example, can be any single one or combination of magnetic memory, optical memory, solid state memory or even remotely mounted memory.

The control unit 110 may further comprise an interface 820 for communications with at least one external device such as a WEM or the like. As such the interface 820 may comprise one or more transmitters and receivers, comprising analogue and digital components and a suitable number of ports for wireline or wireless communication.

The processing circuitry 810 controls the general operation of the control unit 110, e.g., by sending data and control signals to the interface 820 and the storage medium 830, by receiving data and reports from the interface 820, and by retrieving data and instructions from the storage medium 830. Other components, as well as the related functionality, of the control node are omitted in order not to obscure the concepts presented herein.

FIG. 9 illustrates a computer readable medium 910 carrying a computer program comprising program code means 920 for performing the methods illustrated in FIG. 7, when said program product is run on a computer. The computer readable medium and the code means may together form a computer program product 900.

The invention claimed is:

1. A control unit for a heavy duty vehicle, the vehicle comprising an electric machine connected to first and second driven wheels via a differential, and service brakes configured to be used as back-up for handling wheel slip conditions which the electric machine has not been able to control successfully, the control unit comprising a first wheel slip control module associated with the first driven wheel, and a second wheel slip control module associated with the second driven wheel, where each wheel slip control module is arranged to determine an obtainable torque by the respective wheel based on a comparison between a current wheel slip and a configurable wheel slip limit, wherein the control unit is arranged to determine a required torque to satisfy a requested acceleration profile by the vehicle, and to request a torque from the electrical machine corresponding to the smallest torque out of the obtainable torques for each driven wheel and the required torque, wherein the obtainable torque by the respective wheel comprises a peak torque which can be maintained for a first period of time and/or a continuous torque which can be sustained for a second period of time, wherein the second period of time is longer than the first period of time, wherein the control unit is arranged to, during propulsion, reduce the requested torque responsive to both service brakes becoming active.

2. The control unit according to claim 1, wherein each wheel slip control module is arranged to obtain a vehicle velocity and a wheel speed, to determine the current wheel slip.

3. The control unit according to claim 1, where the current wheel slip value is obtained by each wheel slip control module as part of a capability message received from a wheel end module associated with the respective wheel.

4. The control unit according to claim 1, where the configurable wheel slip limit is obtained based on a pre-determined relationship between tire force and current wheel slip.

5. The control unit according to claim 1, wherein the control unit is arranged to obtain an estimated road friction coefficient, and wherein the configurable wheel slip limit is obtained based on a pre-determined lookup table indexed by the estimated road friction coefficient.

6. The control unit according to claim 1, wherein each wheel slip control module is arranged to determine the obtainable torque Ti for wheel i as the smallest of a value based on a comparison between the current wheel slip and the configurable wheel slip limit and a value based on a relationship $$T_i = \mu_i * F_{zi} * r_{wi}$$

where $r_{wi}$ is a wheel radius of the i:th driven wheel, $\mu i$ is an estimated road friction coefficient, and $F_{zi}$ is an estimated tire normal force for each driven wheel.

7. The control unit according to claim 1, wherein each wheel slip control module is arranged to obtain a capability message from a wheel end module associated with the respective driven wheel, wherein the capability message comprises the obtainable torque.

8. The control unit according to claim 1, where the first and second driven wheels are arranged to be braked by respective first and second service brakes, each service brake being controlled by a respective wheel end module, WEM to maintain wheel slip below a configured wheel slip limit, wherein the respective wheel slip control module is arranged to configure the wheel slip limits.

9. The control unit according to claim 1, arranged to detect a split friction condition comprising uneven friction conditions for the first driven wheel and the second driven wheel, wherein each wheel slip control module is arranged to configure a torque to be applied by a corresponding service brake to maintain positive wheel slip below a wheel slip limit, when having detected a split friction condition.

10. The control unit according to claim 9, arranged to reduce the requested torque from the electrical machine in case both of the wheel slip control modules configures a torque to be applied by the corresponding service brake in response to a positive wheel slip above the configured wheel slip limit.

11. The control unit according to claim 1, arranged to configure a torque to be applied by a corresponding service brake based on a requested curvature to modify an understeer gradient associated with the vehicle in dependence of the requested curvature.

12. The control unit according to claim 1, wherein the control unit is arranged to configure a higher wheel slip limit for service brakes compared to a wheel slip limit of the electric machine.

13. The control unit according to claim 1 wherein the control unit is arranged to, during braking, switch to braking with service brakes only responsive to the slip limit at either wheel being exceeded.

14. A vehicle comprising an electric machine connected to first and second driven wheels via a differential, and service brakes configured to be used as back-up for handling wheel slip conditions which the electric machine has not been able to control successfully, the control unit comprising a first wheel slip control module associated with the first driven wheel, and a second wheel slip control module associated with the second driven wheel, where each wheel slip control module is arranged to determine an obtainable torque by the respective wheel based on a comparison between a current wheel slip and a configurable wheel slip limit, and a control unit arranged to determine a required torque to satisfy a requested acceleration profile by the vehicle, and to request a torque from the electrical machine corresponding to the smallest torque out of the obtainable torques for each driven wheel and the required torque, wherein the obtainable torque by the respective wheel comprises a peak torque which can be maintained for a first period of time and/or a continuous torque which can be sustained for a second period of time, wherein the second period of time is longer than the first period of time, wherein the control unit is arranged to, during propulsion, reduce the requested torque responsive to both service brakes becoming active.

15. A method for requesting a torque from an electrical machine in a heavy duty vehicle, the electric machine being connected to first and second driven wheels via a differential, and service brakes configured to be used as back-up for handling wheel slip conditions which the electric machine has not been able to control successfully, the method comprising configuring a first wheel slip control module associated with the first driven wheel, and a second wheel slip control module associated with the second driven wheel, determining, by each wheel slip control module, an obtainable torque for the respective wheel based on a comparison between a current wheel slip and a configurable wheel slip limit, receiving a requested acceleration profile by the vehicle, determining a required torque to satisfy the requested acceleration profile, and requesting a torque from the electrical machine corresponding to the smallest torque out of the obtainable torques for each driven wheel and the required torque, wherein the obtainable torque by the respective wheel comprises a peak torque which can be maintained for a first period of time and/or a continuous torque which can be sustained for a second period of time, wherein the second period of time is longer than the first period of time, wherein the control unit is arranged to, during propulsion, reduce the requested torque responsive to both service brakes becoming active.

16. A non-transitory computer program comprising program code for performing the steps of claim 15 when said program is run on a computer or on processing circuitry of a control unit.

* * * * *